April 25, 1950  I. DU B. TABER ET AL  2,505,440
COLLAPSIBLE SHOPPING BAG
Filed July 8, 1948  3 Sheets-Sheet 1
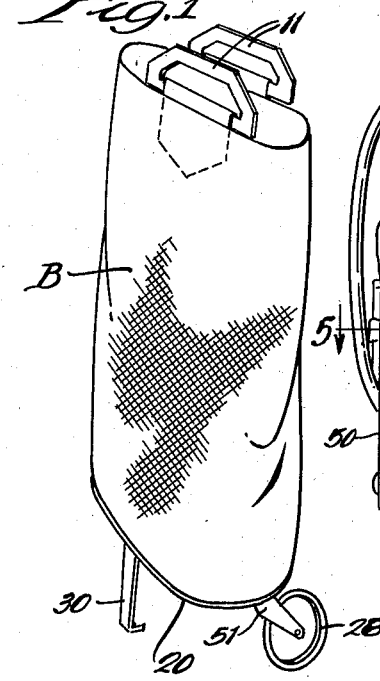
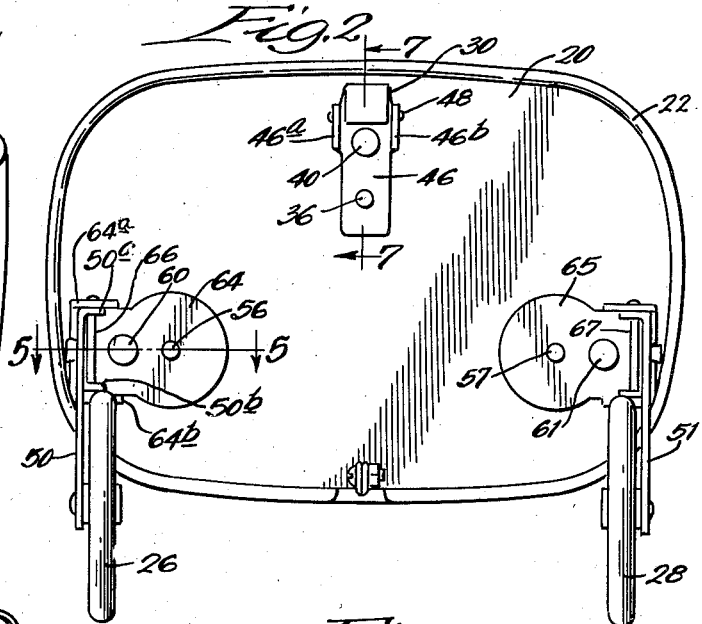
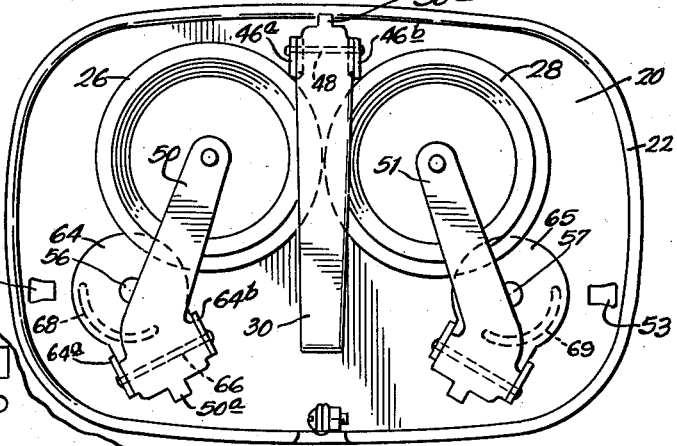
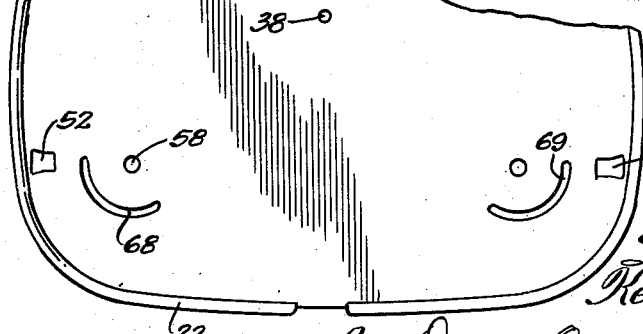
Inventors:
Irene DuBois Taber,
Leland O. Taber and
Kenneth F. Spalding
By Dawson, Ooms, Booth and Spangenberg,
Attorneys.

April 25, 1950     I. DU B. TABER ET AL     2,505,440
COLLAPSIBLE SHOPPING BAG
Filed July 8, 1948     3 Sheets-Sheet 2
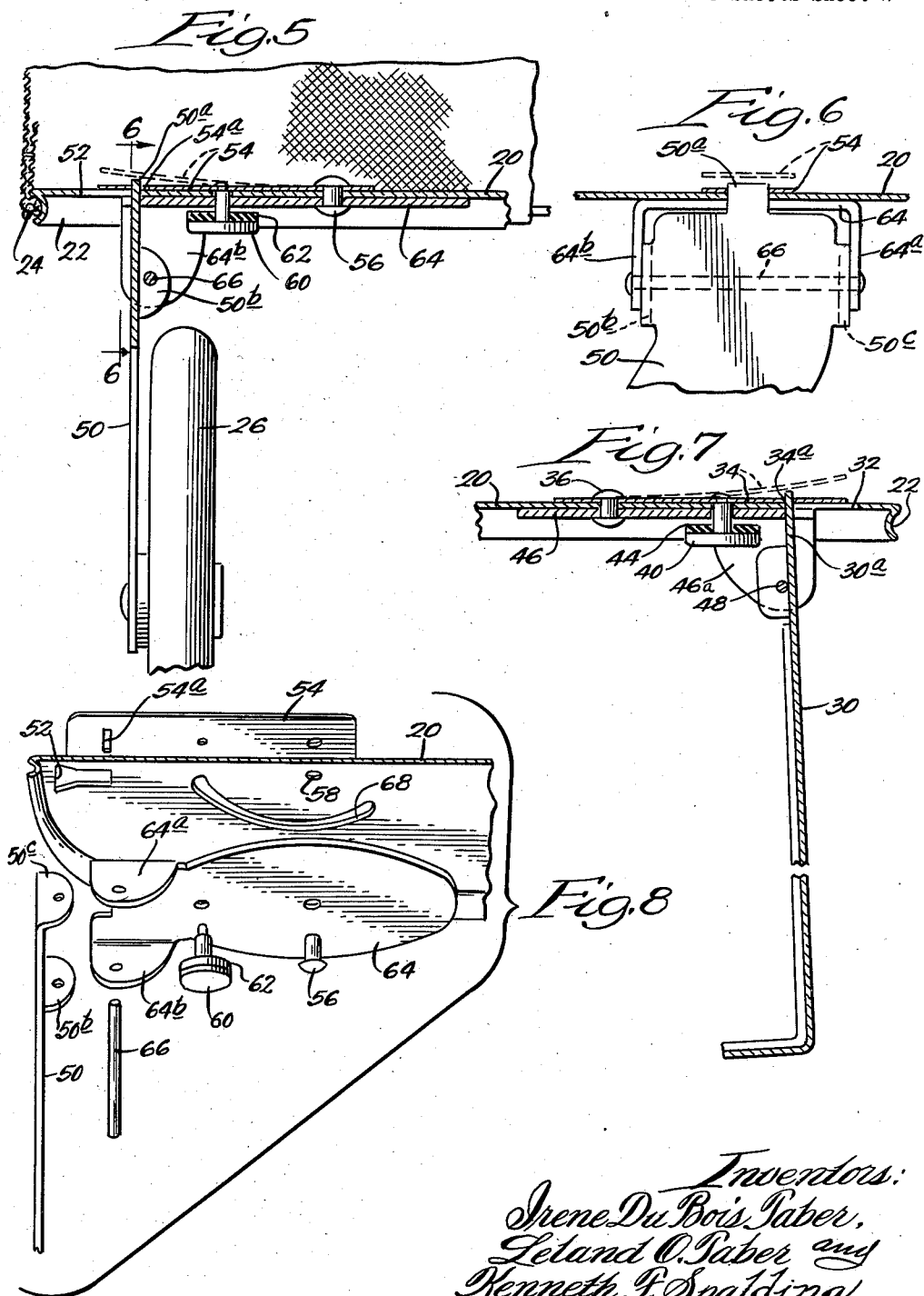

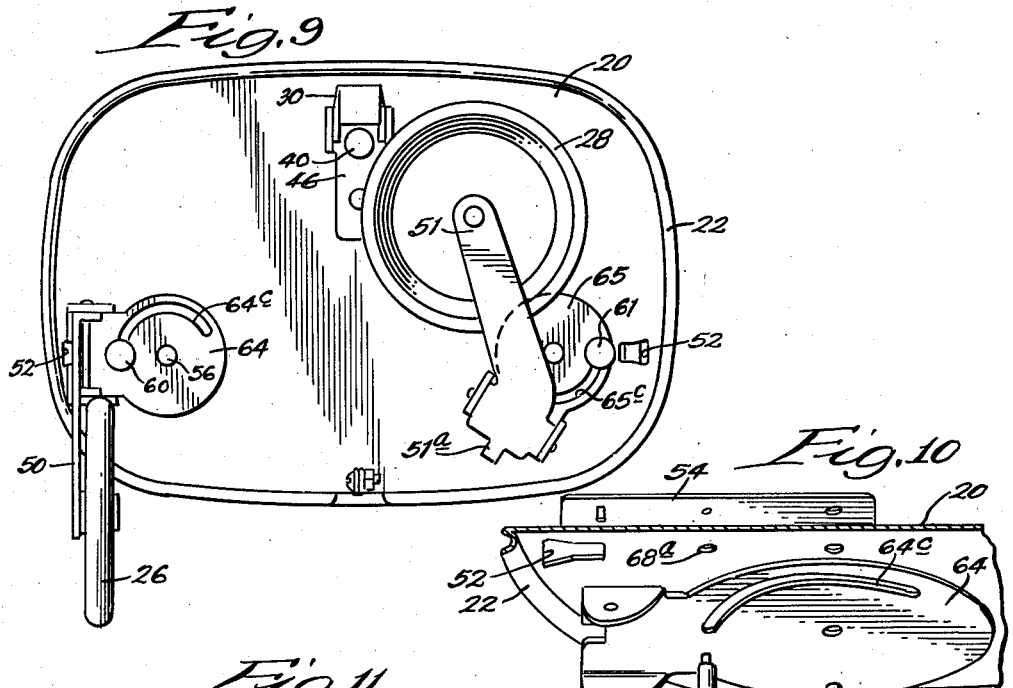

Patented Apr. 25, 1950

2,505,440

UNITED STATES PATENT OFFICE 2,505,440

COLLAPSIBLE SHOPPING BAG

Irene Du Bois Taber and Leland O. Taber, Chicago, and Kenneth F. Spalding, Oak Park, Ill.

Application July 8, 1948, Serial No. 37,608

6 Claims. (Cl. 280—38)

Our invention relates to an improved shopping bag capable of being supported from a surface, such as a sidewalk, and having foldable support members.

It is frequently desirable to carry parcels and the like in a shopping bag capable of deriving support from a sidewalk or road. However, when the bag is not full, it is also desirable to carry it as a small compact light weight unit. In accordance with the present invention these desirable features are achieved by providing an improved shopping bag having a base portion with foldable support members. Releasable elements sustain these members in the supporting position and may be released to permit folding thereof against the base for ease of carrying when not desired for support.

It is accordingly an object of the present invention to provide an improved shopping bag having foldable support members.

A further and more specific object of the present invention is to provide an improved shopping bag having foldable support members incorporating releasable catch elements to hold these members in the unfolded or extending position.

Yet another object of the present invention is to provide an improved shopping bag having foldable support members and which incorporates stop elements capable of guiding these members to the folded and unfolded positions.

Our invention further resides in providing an improved shopping bag with foldable support members and embodying features of construction, combination, and arrangement rendering it simple and inexpensive in construction and reliable in operation as well as easy to manipulate to the end that a structure of maximum utility is obtained.

The novel features which we believe to be characteristic of our invention are set forth with particularity in the appended claims. Our invention itself, however, both as to its organization and method of operation may best be understood by reference to the following description taken in connection with the accompanying drawing in which:

Figure 1 is an isometric view showing the bag of the present invention in the extended position with the support members unfolded;

Figure 2 is an enlarged view of the bag of Figure 1 as seen from the bottom;

Figure 3 is a view like Figure 2 but showing the support members in the folded condition;

Figure 4 is a view of the base of the bag showing the openings provided therein;

Figure 5 is a cross-sectional view through the axis 5—5, Figure 2;

Figure 6 is a cross-sectional view through the axis 6—6, Figure 5;

Figure 7 is a cross-sectional view through the axis 7—7, Figure 2;

Figure 8 is an exploded view showing the arrangement of one carriage and the associated parts of the structure of Figures 1 to 7;

Figure 9 is a view from the bottom of an alternative embodiment of the present invention;

Figure 10 is an exploded view of one carriage and the associated elements of the structure of Figure 9;

Figure 11 is a view from the bottom of another alternative embodiment of the present invention;

Figure 12 is a cross-sectional view through the axis 12—12, Figure 11; and

Figure 13 is an exploded view of one carriage and the associated elements of the structure of Figures 11 and 12.

Referring now to the isometric view of Figure 1 there is shown at B a bag of cloth or the like formed in the shape of a tube. At its upper end, the bag B receives the handles 11 which are of wood or the like and have suitable openings to receive the hands of the user and the loops of material by which the handles are attached to the bag B.

The bag B receives a base 20, Figure 2, at its lower portion. As seen best in Figure 5, this base is provided with a marginal rim 22 having an outwardly cupped cross-section. The bag B is folded over at its bottom portion to receive the elastic band 24 as shown in Figure 5. The band 24 stretches when the lower portion of the bag encircles the rim 22 and thereby holds the bag in snug engagement therewith.

The wheels 26 and 28, together with the support pin 30, are foldably secured to the base 20 by means to be described in further detail hereafter. The wheels 26 and 28 are in parallel relationship in the unfolded position shown in Figure 2 and the support pin 30 defines a triangle in connection with these wheels. When it is desired to carry packages in bag B without the associated lifting, the bag is tilted to place the weight on wheels 26 and 28 and pulled along. If it is desired to stand the bag without further support, the bag is tilted back to rest on pin 30 as well as wheels 26 and 28.

The method of securing the pin 30 to the base 20 may best be understood by reference to Figures 2, 4, and 7. From these figures it will be evident that an indexing opening 32 is provided in base 20 adjacent pin 30 and defines a slot to receive the protuberance 30ª of pin 30 as the latter is moved to the unfolded position. Moreover, a flexible catch 34 is attached to base 20 and overlies the opening 32. This catch is preferably of spring steel and has a small opening 34ª which snugly receives the protuberance 30ª when pin 30 is in the unfolded position of Figure 7.

The catch 34 is secured to base 20 by the rivet 36 which is received in opening 38 in base 20 and by the detent 40 which is received in opening 42 of base 20. As shown clearly in Figure 7, the detent 40 defines shoulders on opposite sides of the catch 34 and a knob portion below the base 20. A resilient washer 44 of rubber or the like is interposed between the knob portion of the detent 40 and the base 20 and acts to urge the knob 40 and catch 34 to the engaged position of Figure 7.

The pin 30 is swingably supported from the base 20 by the fixed carriage 46 which is secured to base 20 by the rivet 36 and detent 40. This carriage defines a pair of ears 46ª and 46ᵇ which define spaced bearings to receive the pin 48, thereby sustaining pin 30 for swinging movements about the axis of pin 48.

The manner of securing wheels 26 and 28 to the base 20 is best shown in the views of Figures 5, 6, and 8 which show in detail the mounting of wheel 26. As indicated, the wheel 26 is received on wheel support member 50 which may, for example, be a sheet steel stamping. The member 50 defines a protuberance 50ª, Figure 5, which is received in the opening 52, Figure 4, of base 20 when wheel 26 is in the unfolded position.

A flexible catch 54 is snugly held against base 20 and overlies the opening 52. This catch has a relatively small opening 54ª which snugly receives the protuberance 50ª to hold the wheel 26 in the unfolded position.

The catch 54 is secured to base 20 by the rivet 56 which is received in hole 58 of base 20. In addition, the catch 54 derives support from detent 60 which defines shoulders on opposite sides of the catch 54 and a handle portion below base 20. A resilient washer 62 of rubber or the like is interposed between the handle portion of detent 60 and the base 20 to supplement the spring action of catch 54 and urge detent 60 and catch 54 to the engaged position shown in Figure 5.

The wheel support member 50 is received on the swingable carriage 64 which defines a pair of spaced ears 64ª and 64ᵇ. These ears define spaced bearings which receive pin 66 upon which also ride the spaced ears 50ᶜ and 50ᵇ of member 50. The latter ears are in snug fit relative to ears 64ª and 64ᵇ to hold the member 50 against axial shifting movements along pin 66.

The carriage 64 is secured to the base 20 by the rivet 56 which permits rotational movements of this carriage about the axis of that rivet. Carriage 64 also receives the detent 60 but, since that detent rides in the arcuate slot 68 of the base 20, the carriage 64 is nevertheless free to rotate about the arc defined by that slot.

From the foregoing it will be evident that the wheel 26 is foldably secured to the base 20 by the carriage 64 which is free for limited swinging movements about the rivet 56 and with respect to which wheel 26 itself is capable of swinging movements about the axis of pin 66. Moreover, catch 54 releasably secures wheel 26 in the unfolded position of Figure 2. In addition the carriages and the base define cooperating stops when the detents engage the ends of the arcuate slots 68 and 69 and thereby index the carriages to the positions wherein members 50 and 51 are held by the catch elements.

Wheel 28 is foldably supported from base 20 in like manner as wheel 26. This support is secured from support member 51 which is supported by carriage 65 for swinging movements about the pin 67. The carriage 65 is supported by rivet 57 for swinging movements about the axis thereof. Detent 61 is attached to a catch like catch 54, Figure 5, which releasably holds wheel 28 in the unfolded position.

Figures 9 and 10 show an alternative embodiment of the present invention. The structure shown is like the structure of Figures 1 to 8 but the arcuate slots 68 and 69, Figure 4, are omitted. Instead arcuate slots 64ᶜ and 65ᶜ are provided in carriages 64 and 65 respectively.

In the structure of Figures 9 and 10, the detents 60 and 61 remain stationary. This is due to the fact that these detents snugly ride in suitable openings in the base 20, such as opening 68ª, Figure 10. The flexible catch members, such as 54, Figure 10, likewise remain stationary.

Swinging movements of carriages 64 and 65 are limited in the structure of Figures 9 and 10 by the engagement of slots 64ᶜ and 65ᶜ with the detents 60 and 61. One edge of these slots is positioned to align the protuberances 50ª and 51ª of members 50 and 51 with the indexing openings 52 and 53 of base 20.

In the embodiment of Figures 11, 12, and 13, the carriages 64 and 65 are fixedly attached to the base 20 by the rivets 56 and 57, respectively and the detents 60 and 61, respectively. However, the ears 64ª and 64ᵇ of carriage 64 and the ears 65ª and 65ᵇ of carriage 65 receive stirrups 70 and 72, respectively. These contain suitable openings to receive the pins 66 and 67 to hold the stirrups for swinging movements about these axes.

The wheel support members 50 and 51 are pivotally attached to the stirrups 70 and 72 by the pins 74 and 76, respectively.

Figure 13 is an exploded view showing the relative positioning of the support member 51, stirrup 72, carriage 65, base 20, and the catch 55.

If desired, the arm 51 may have an overhanging tongue (not shown) on its upper edge to engage the stirrup 72 when that arm is swung to the extending position of Figure 12 or to the collapsed position of Figure 11. This tongue is located on the edge of arm 51 adjacent the rim 22 when the wheel is in the folded position to index both the opening and folding movements of that arm.

From the foregoing description it will be evident that we have provided an improved shopping bag having a base to which support elements are foldably secured for ease of carrying. Moreover these elements are releasably held in the unfolded position to provide a firm and secure support for the bag.

While we have shown and described particular embodiments of our invention it will, of course, be understood that we do not wish to be limited thereto since various modifications and alternative constructions may be made without departing from the spirit and scope thereof.

We claim:

1. In a shopping bag adapted to be supported from a surface, a base, a pair of carriages supported from said base for swinging movements about axes perpendicular thereto, a pair of members foldably secured to said base, wheels attached to said members to support said base when said carriages and said members are in predetermined positions, indexing openings in said base adjacent said carriages, said members having protuberances to be received in said openings to sustain said carriages and said members in said predetermined positions, an arm foldably secured to said base, said base having an indexing opening adjacent said arm, said arm having a protuberance to be received in said last opening when said arm is in the unfolded position, said arm and said wheels being disposed on said base to engage said surface at spaced points defining a triangle to support said bag.

2. In a shopping bag, a base having an indexing opening, a carriage swingably supported on said base, a member foldably supported from said carriage and having a protuberance to be received in said opening when said member is in the unfolded position and said carriage is in predetermined position, a flexible catch arm attached to said base and overlying said opening, said arm having an indexing opening snugly to receive said member to sustain said member in the unfolded position, a detent extending through said base and selectively operable to flex said catch arm to release said member, said carriage having an arcuate opening in registry with said detent to index the swinging movements of said carriage.

3. In a shopping bag, a base having an indexing opening, a carriage swingably supported on said base, a member foldably supported from said carriage and having a protuberance to be received in said opening when said member is in the unfolded position and said carriage is in predetermined position, a flexible catch arm attached to said base and overlying said opening, said arm having an indexing opening snugly to receive said member to sustain said member in the unfolded position, a detent extending through said base and selectively operable to flex said catch arm to release said member, said base having an arcuate opening in registry with said detent to index the swinging movements of said carriage.

4. In a shopping bag, a base, a carriage fixedly supported from said base, a stirrup swingably supported from said carriage for swinging movements about an axis parallel to said base, and a support member swingably attached to said stirrup, said base having an indexing opening and said member having a protrusion to ride in said opening when said carriage is in predetermined position and said member is swung to an extended position, a flexible arm received in said base and overlying said opening, said last member having an opening snugly to receive said protuberance, and a detent projecting through said base to flex said arm to release said first member.

5. An assembly for use in a foldable shopping bag having a base with an indexing opening, said assembly comprising a carriage attached to said base, said carriage having a pair of spaced ears, a pin extending between said ears in a direction parallel to said base, a support member defining a pair of spaced ears mating with said first ears and received on said pin, and a flexible catch arm attached to said base and overlying said indexing opening, said catch arm having an opening of smaller extent than said indexing opening and overlying said indexing opening, said support member having a protuberance snugly to be received in said last opening when said member is substantially perpendicular to said base, said protuberance being adapted to ride in said first opening when said member is swung about the axis of said pin.

6. In a foldable shopping bag, the improvement which comprises a base having an elongated opening, a support member attached to said base for swinging movements about an axis parallel thereto and perpendicular to said opening, said member having a protuberance to be received in said opening as said member is swung to an extending position, a flexible arm attached to said base and overlying said opening, said arm having an opening snugly to receive said protuberance to hold said support member in the extended position, and a detent projecting through said base to flex said arm to release said support member.

IRENE DU BOIS TABER.
LELAND O. TABER.
KENNETH F. SPALDING.

REFERENCES CITED

The following references are of record in the file of this patent:

UNITED STATES PATENTS

| Number | Name | Date |
|---|---|---|
| 485,230 | Scheuer | Nov. 1, 1892 |
| 669,222 | Ruher | Mar. 5, 1901 |
| 2,305,432 | Kupfermann | Dec. 15, 1942 |

FOREIGN PATENTS

| Number | Country | Date |
|---|---|---|
| 386,242 | Germany | Dec. 6, 1923 |